United States Patent [19]

Boros

[11] 4,095,165
[45] June 13, 1978

[54] SWITCHING REGULATOR CONTROL UTILIZING DIGITAL COMPARISON TECHNIQUES TO PULSE WIDTH MODULATE CONDUCTION THROUGH A SWITCHING DEVICE

[75] Inventor: Victor Bert Boros, New York, N.Y.

[73] Assignee: Bell Telephone Laboratories, Incorporated, Murray Hill, N.J.

[21] Appl. No.: 733,058

[22] Filed: Oct. 18, 1976

[51] Int. Cl.² .............................................. G05F 1/56
[52] U.S. Cl. .................................... 323/17; 323/22 T; 323/DIG. 1
[58] Field of Search .................. 323/17, 19, 22 T, 24, 323/43.5 S, 45, DIG. 1; 363/20, 21, 124

[56] References Cited

U.S. PATENT DOCUMENTS

| | | | |
|---|---|---|---|
| 3,018,431 | 1/1962 | Goldstein | 323/45 |
| 3,562,625 | 2/1971 | Broek | 323/24 X |
| 3,611,117 | 10/1971 | Schneider | 323/45 |
| 3,952,240 | 4/1976 | Ruumpol | 323/45 X |

OTHER PUBLICATIONS

IBMTDB, Debrita et al., "Integrated Binary Power Controller," vol. 17, No. 8, Jan. 1975, pp. 2227–2229.
IBMTDB, Calvo et al., "Analog-Digital Transistor Switching Regulator Controller, " vol. 17, No. 9, Feb. 1975, pp. 2666, 2667.

*Primary Examiner*—A. D. Pellinen
*Attorney, Agent, or Firm*—Alfred G. Steinmetz

[57] ABSTRACT

A switching regulator includes a digital feedback control circuit to regulate the output voltage. The frequency output of a voltage controlled oscillator responsive to the output voltage is periodically counted. The accumulating count is continuously compared with a reference count. The elapsed time for this count to accumulate to a value equaling the reference count determines the duty cycle of periodic conduction through the switching device of the switching regulator.

8 Claims, 4 Drawing Figures

SWITCHING REGULATOR CONTROL UTILIZING DIGITAL COMPARISON TECHNIQUES TO PULSE WIDTH MODULATE CONDUCTION THROUGH A SWITCHING DEVICE

BACKGROUND OF THE INVENTION

1. Field of the Invention

This invention relates to voltage regulators and, more specifically, to pulse width modulated switching voltage regulators. It is particularly concerned with a switching voltage regulator having digital feedback control utilizing frequency averaging techniques.

2. Prior Art

The conventional switching-type voltage regulator utilizes analog-type signal circuitry. The conventional switching regulator generally includes a switch, a switching drive, and a filter circuit as its main components. The switch is operated by the switching drive to periodically chop an applied DC input voltage. The chopped voltage is applied to the filter which derives therefrom an average DC voltage.

The switch is usually a transistor or SCR device which is operated in a fully conducting state, and an alternately nonconducting state. The drive circuit for the switch is generally coupled with a feedback circuit to regulate the output voltage. In the pulse width modulated type of switching regulator the pulse duty cycle is varied as a function of a line or load signal magnitude to compensate for changes therein. In most instances a regulated output voltage is compared with a reference voltage and the duty cycle of the switching device is modified to maintain the output voltage at a desired regulated value.

Analog feedback circuitry, while simple to implement, is difficult to conrol with respect to signal variations due to environmental factors. Such factors include the ambient temperature in which the circuit operates, the age of the circuitry, and other characteristic variations in the individual components of the circuit. Various compensating schemes have been devised to combat these disadvantageous environmental factors. Such schemes include component compensation circuits which add to the complexity of the circuitry. Other schemes require a careful coordinated selection of circuit components whose changes in response to environmental factors tend to cancel each other.

Recent switching regulator designs are beginning to utilize digital components in the regulation circuitry. An example of a digital feedback scheme differing from the conventional analog scheme is disclosed in U.S. Pat. No. 3,445,754, issued to S. L. Broadhead on May 20, 1969. In this switching type voltage regulator the conduction through a switching device is pulse width modulated in response to the comparison of the signal of a reference oscillator and the signal of a voltage controlled oscillator responsive to the regulated output voltage. The input DC voltage is coupled to a switching device. The conductivity of the switching device is controlled by a flip-flop circuit whose RS inputs are triggered respectively by the reference oscillator output and the voltage controlled oscillator output. The phase relation between the voltage controlled oscillator and the reference oscillator controls the duration of the DC signal voltage transmitted by the switching device to the output of the voltage regulator. This pulse width modulation arrangement controls the magnitude of the output voltage.

The Broadhead feedback control circuit is a phase-locked loop oscillator control for a voltage regulator which includes a voltage controlled oscillator. This control uses the signal phase difference between the voltage controlled oscillator output and the reference oscillator output to control the output of the regulator. While the form of the reference signal is different from the form of the output signal, this is still an analog signal approach and includes many of the same disadvantages due to environmental factors.

It is specifically an object of the present invention to control the duty cycle of a switching regulator with digital techniques exclusive of analog techniques.

It is particularly an object of the invention to replace the analog feedback control of the conventional switching regulator with a digital feedback control.

It is more particularly an object to establish a reference signal which is digital and which is digitally manipulated to improve the regulation response of the switching regultor.

It is a further object to establish an invariant reference signal which is not affected by environmental factors.

SUMMARY OF THE INVENTION

Therefore, in accordance with the present invention, a switching regulator utilizes digitally derived feedback control signals, and incorporates the inherent advantages of digital feedback control to achieve positive gain control which is stable and accurate, permits the application of programmed type control, and further permits precise specification of the static and dynamic response of a switching regulator. This digital switching regulator operates by counting the frequency output of a voltage controlled oscillator which is responsive to the output of the regulator. The count of the frequency output of the voltage controlled oscillator is accumulated and continuously compared with a reference number. The elapsed time necessary for the count to accumulate to a value equaling a reference number determines the pulse width modulation of the signal being modulated by the switching device of the regulator. This reference number is invariant and very amenable to manipulation to precisely control the static and dynamic performance of the regulator.

This particular digital approach advantageously eliminates the analog components of conventional feedback control circuits which are subject to environmental factors such as temperature changes, aging, supply voltage changes, and changes in the reference signal. Control signals in the conventional analog feedback circuit tend to drift from their desired values in response to these environmental factors. Furthermore, in the conventional analog feedback control, once particular circuit characteristics have been established they are difficult to modify or change within any particular circuit design.

A basic proportional type digital feedback control embodiment according to the invention comprises a voltage controlled oscillator connected to the output voltage being regulated and operating in response thereto as a voltage magnitude-to-frequency converter. The frequency output of the voltage controlled oscillator is applied to a counting circuit which is periodically reset in response to a clock source. Conduction in the regulator's switching device is periodically initiated in response to the clock source. The counter periodically counts the cycles of the signal frequency output of the voltage controlled oscillator. The accumulating periodic count is continuously compared with a preset reference count by a comparator. When the periodic count responsive to the voltage controlled oscillator frequency attains a certain numerical value equaling the reference count, the conducting interval of the switching regulator's switching device is terminated. The duration of the conducting interval determines the regulated output voltage of the regulator.

Various added control functions are added to the basic proportional digital feedback loop to provide various additional control functions. Basically the stability of the regulated output signal is improved by the addition of a count modifier which may comprise a register or an up-down counter in the digital feedback loop. This count modifier or up-down counter operates to dynamically alter the reference number used to control the conduction interval of the switching device of the regulator. Derivative and integral feedback techniques operate in conjunction with the up-down counter to supplement the response of the basic proportional digital feedback control. These techniques are utilized to improve the static and dynamic response of the digital feedback loop.

The basic proportional feedback control circuit responds to a step change in the input voltage by introducing oscillations in the regulated output signal. To counteract these oscillations a derivative feedback signal is combined with the basic proportional feedback signal. This derivative signal is proportional to the rate of change of the output voltage. This added derivative feedback signal improves the dynamic response of the digital feedback control by dampening the oscillatory response of the output voltage of the regulator to step changes in the input voltage. This derivative feedback signal is generated digitally by computing the average of the difference between successive counts of the voltage controlled oscillator during successive periods. The derivative number is applied to the up-down counter in order to periodically modify the reference number.

A step change in the input voltage also introduces a static error into the regulated output voltage. This error is integrated and combined with the basic proportional feedback signal to counter the static error. The digital integration is performed by a summation of successive difference counts between the voltage controlled oscillator output count and a selected reference number which may equal or differ slightly from the basic reference number in the proportional feedback control circuit. This integrative count is used to dynamically modify the basic reference number. The aforementioned derivative and integral feedbacks are combined with the basic proportional feedback control to improve the dynamic and static performance of the regulated switching regulator.

Proper performance of the digital feedback control of the switching regulator may require that the gain of the various feedback functions described above be adjusted to values other than unity. Gain multiplication is easily obtained therein by a simple digital shifting operation in the digital feedback loop. This shifting may be done by a register included therein or may be done by simple wiring connections. Through these techniques any desired gain of $2^n$ magnitude may be obtained which is invariant with respect to environmental factors. Separate predetermined gain settings may be individually set for any of the integral or derivative feedback loops.

The gain and sequencing of the feedback functions is controlled by a separate sequencing control unit which controls the sequencing and shifting of the various constants associated with the various control functions.

DETAILED DESCRIPTION

Figure 1:
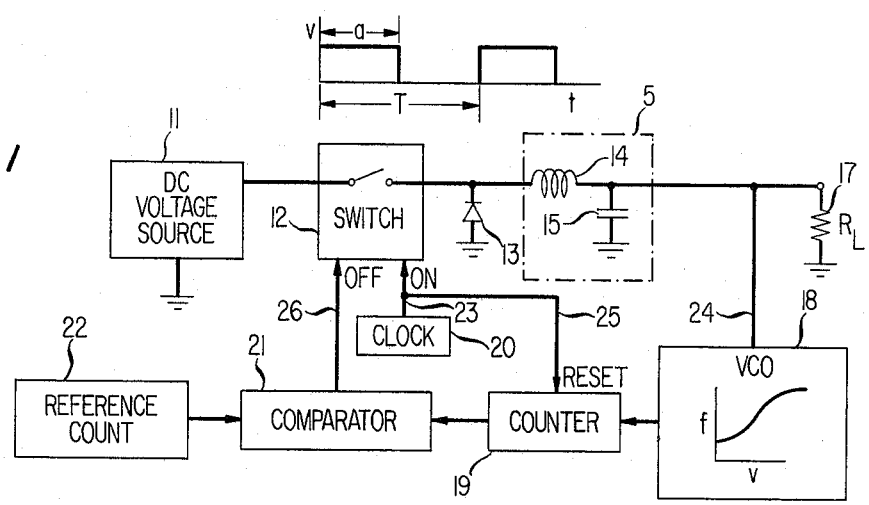
FIG. 1 is a partial block diagram and schematic of a basic switching regulator using digital feedback control.

The switching regulator disclosed in FIG. 1 is a pulse width modulated switching regulator which incorporates digital devices and a voltage-to-frequency converter or an amplitude to frequency modulation circuit in a digital regulation feedback control as opposed to the analog devices of a conventional switching regulator. The analog reference signal of the conventional switching regulator is replaced herein by a digital reference quantity which has the advantageous property of being invariant to the aforedescribed environmental factors.

A DC voltage source 11 is coupled to a load impedance 17 through a switch 12 and a low-pass filter 5. A clock, or periodic timing circuit, 20 is utilized to establish a modulation period and is coupled to periodically enable conduction through the switch 12 via a signal applied thereto on lead 23. This signal applied at lead 23 initiates the modulation period T of the switching regulator as shown in the voltage waveform shown adjacent to switch 12 in FIG. 1. This switch is subsequently disabled, or opened and held off, for the remainder of the modulation period in response to the digital feedback control comprising a voltage controlled oscillator 18, a counter 19, a comparator 21, and a reference count register 22. The voltage regulator operates so that the conduction interval of the switch shown as interval $a$ in the waveform adjacent to switch 12 varies inversely with the magnitude of the output voltage. The digital feedback circuit controls the conduction interval $a$ of the switch 12 to precisely regulate the output voltage. If the output voltage decreases, the conduction interval of $a$ switch 12 is increased. If the output voltage increases, the conduction interval $a$ of switch 12 is decreased.

The voltage controlled oscillator 18 is coupled, via lead 24, to monitor the output voltage of the regulator. The output of the voltage controlled oscillator 18 is a signal whose frequency is proportional to the output voltage magnitude of the regulator. If the output voltage decreases, the output frequency of the voltage controlled oscillator 18 decreases. Conversely, if the output voltage increases, the output frequency of the voltage controlled oscillator 18 also increases. The frequency and voltage characteristics of a voltage controlled oscillator suitable for use herein are shown by the transfer curve shown within the block representing the voltage controlled oscillator 18. The circuit used herein is designed so that it will normally operate on the linear portion of the transfer curve shown therein.

At the beginning of each modulation period T, the counter 19 is reset to zero in response to a reset signal applied thereto, via lead 25, by the clock 20. The frequency output of the voltage controlled oscillator 18 is applied to the counter 19 and the frequency pulses are counted. This count appears in the counter 19 as a binary count. This continuing count is applied to a comparator circuit 21. A preset binary reference count is also applied to the comparator 21 by the reference count register 22. The reference count is preselected to be representative of and maintain the desired requested output of the regulator. When the count in the counter 19 equals the preset reference count, the comparator 21 applies a turn-off pulse, via lead 26, to the switch 12. The time required by the counter 19 to reach the reference count varies inversely with the frequency of the signal output of the voltage controlled oscillator 18. If the voltage controlled oscillator frequency decreases because the output voltage decreases below its desired value, the time required to reach the preset count, i.e., the time at which the switch opens, increases so as to maintain the average output voltage on the regulator at a constant value. The corrective feedback signals supplied by the digital feedback control are a function of the error of the output voltage from its desired required value.

Figure 2:
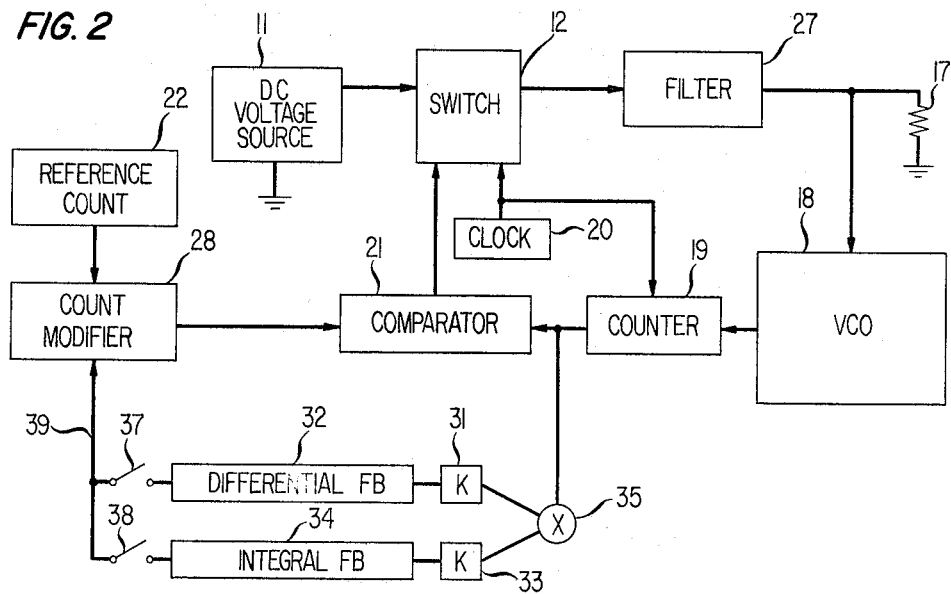
FIG. 2 is a block diagram of a switching regulator having digital feedback control including integral and derivative functions added therein.

The switching regulator shown in FIG. 2 includes added control functions in the digital feedback control arrangement to introduce increased flexibility into the feedback control. The additions to the digital feedback control to achieve this desired flexibility include a count modifier 28. The count modifier 28 in the illustrative embodiment may comprise an up-down counter. The count modifier 28 responds to a series of pulses generated by the added control functions and operates to modify the binary reference count. The added control functions include auxiliary feedback paths from the output of the counter 19 to the count modifier 28. These auxiliary feedback paths include gain multipliers 31 and 33, and associated therewith a differential feedback circuit 32, and an integral feedback circuit 34, respectively. In accord with the invention these circuits are digitally implemented.

To achieve specific desired feedback responses, the various auxiliary feedback circuits are selectively included in the feedback control by selectively closing switches 37 and 38. This applies control signals to the count modifier 28 which alters the reference count as supplied by reference count register 22 to the comparator 21. The voltage waveforms in FIG. 3 illustrate the various controlled feedback responses to input voltage changes that are achieved by connecting selected portions of the auxiliary feedback circuitry into the feedback loop.

Figure 3:
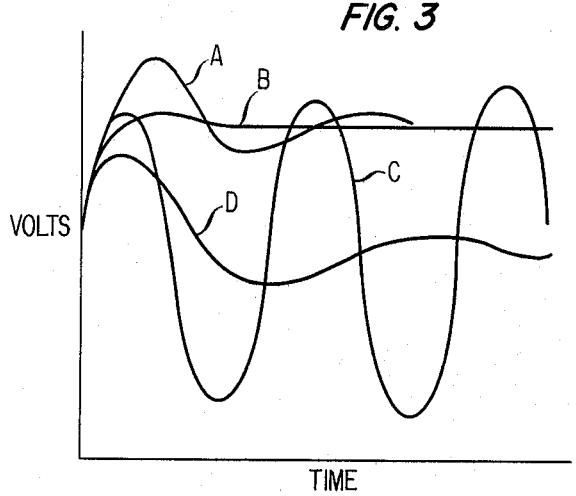
FIG. 3 shows voltage waveforms describing the response of the various feedback control functions disclosed in FIG. 2 to input voltage variations.

The voltage waveforms in FIG. 3 show the voltage output response of the regulator to a step-type voltage change of the DC voltage source 11. The conventional or proportional response in which switches 37 and 38 are disconnected is shown by waveform A in FIG. 3. Waveform A represents the proportional regulatory response of the voltage regulation circuit shown in FIG. 1 to a step change in the applied DC input voltage. As is apparent from waveform A, the input voltage supplied by DC voltage source 11 is increased in a step function, and the regulated output voltage of the regulator increases to oscillate about a higher fixed average output voltage.

To achieve improvement in the response of the feedback loop, the output of counter 19 is modified by various feedback circuits which are connected thereto by a common electrical node 35. The electrical node 35 is coupled in parallel to two gain multipliers 31 and 33 and the associated differential feedback circuit 32 and integral feedback circuit 34, respectively. Both of these circuits are connected to the count modifier 28 via the switches 37 and 38. The gain elements 31 and 33 may comprise shift registers or plain wiring logic which shift the digital output of the counter 19. These counts are sequentially applied to the count modifier 28 and modifies the count supplied by the reference count register 22 to achieve a predetermined gain in the feedback loop.

The digital feedback control may be modified to respond to the derivative of the output of the regulator. This is accomplished by closing the switch 37 to include the differential feedback circuit 32 in the feedback loop. This permits the output of the counter 19 applied to electrical node 35 to be differentiated. This arrangement dampens the output of the regulator to suppress the oscillatory signals which were observed in voltage waveforms A and C with the proportional and integral feedback arrangements. The regulated voltage output response with differentiation included with the proportional feedback circuit is shown by the voltage waveform B. Here the output voltage signal, in response to a step change in the input voltage, still increases by a step value but the oscillations of the output voltage are significantly damped.

The closing of switch 38 includes the integral feedback circuit 34 in the feedback regulation loop. Integration is added to eliminate the static error in the output voltage which was observed above with respect to the proportional and differential feedback loops. With just the integral feedback circuit 34 included with the proportional feedback by closing switch 38, the output response of the regulator to a step input change is shown by the voltage waveform C shown in FIG. 3.

It is apparent that with integration in the feedback control, no static error is introduced into the output voltage signal of the voltage regulator by a step input change. The output voltage, however, tends to be unstable, producing undamped oscillations centering around the desired regulated voltage value.

The optimum response of the circuit is achieved when both switches 37 and 38 are closed and the differential and integral feedback circuits are both included with the proportional feedback control loop. The output voltage response of the regulator to a step voltage input change with this connection is shown by waveform D in FIG. 3.

It is apparent that the inclusion of the integral feedback circuit reduces the static error resulting from a step input voltage change and the inclusion of the differentiation feedback circuit unit damps the oscillatory tendencies of the output. This is a practical arrangement for the digitally controlled voltage regulator and is shown in detail in FIG. 4.

Figure 4:
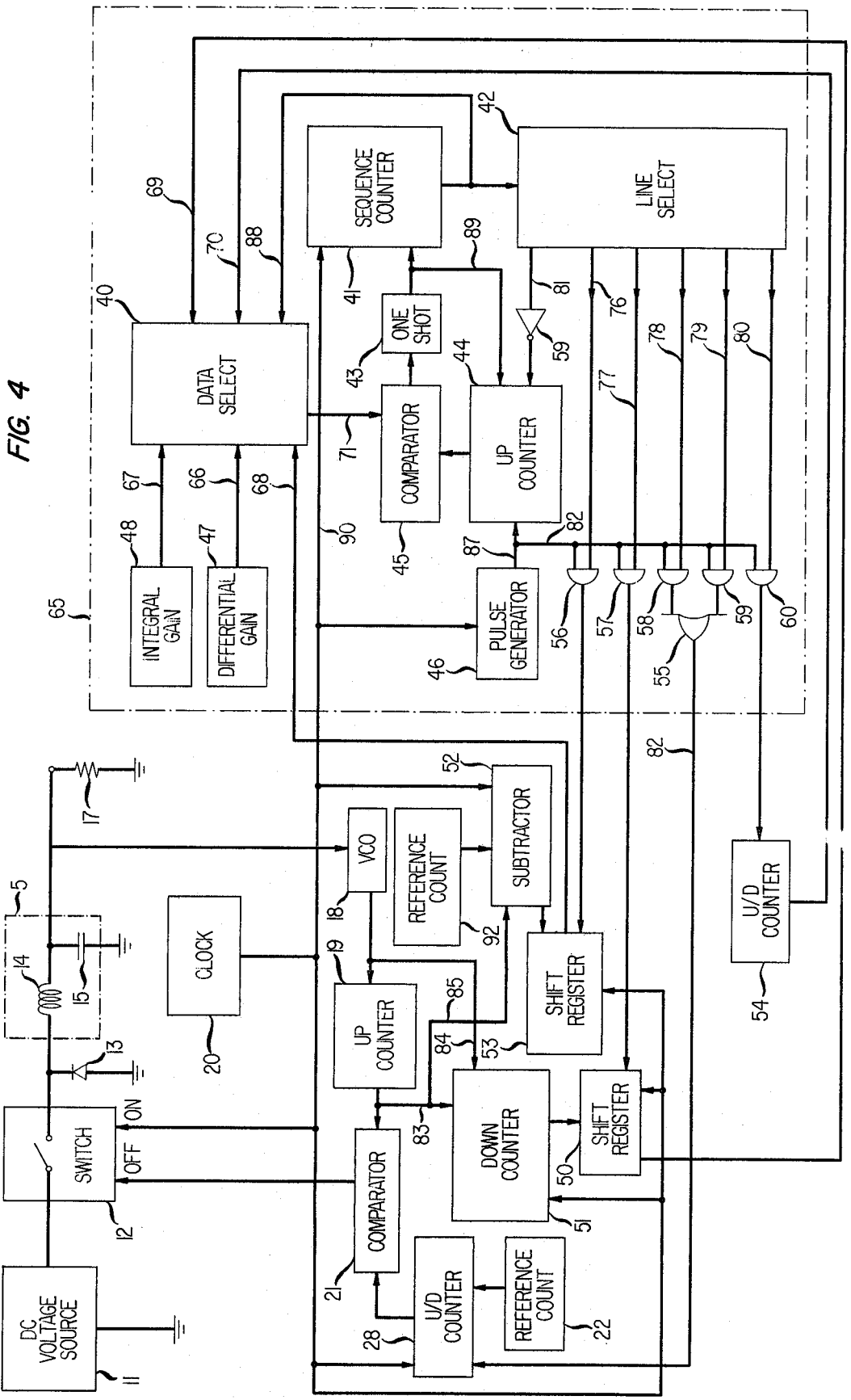
FIG. 4 is a detailed partial block diagram and schematic of a switching regulator having proportional, integral and derivative feedback control.

FIG. 4 discloses a detailed schematic and block diagram of a digitally controlled switching regulator that includes proportional, differential and integral feedback control. The basic digital control providing the proportional feedback control is identical to the controls described with reference to FIG. 1. Additional registers, counters and subtracting circuits are disclosed which operate under the control of a central feedback sequencing control 65 to provide the additional differential and integral feedback control functions. All of these units operate periodically in response to the clock source 20 which generates periodic pulse signals to synchronize the activity of the switching regulator and the central feedback sequencing control 65 and the various counting, subtracting and register circuits. At the beginning of each modulation period of operation when the switch is initially closed, the clock operates to reset all the counting, subtracting, and register units to subsequently operate within the period.

As described above, the DC voltage source 11, which may comprise a battery, is applied to the control switch 12. The switch, which may comprise a transistor, periodically conducts, having a conduction duration responsive to the feedback control. This applies a chopped DC voltage to the filter circuit 5. The filter circuit 5 derives an average DC voltage therefrom which is applied to the load 17. The digital feedback control operates to regulate the output voltage by controlling the conduction interval of the switching device during each period of operation. The digital feedback control includes the clock source 20 whose output initiates conduction in the switch 12 and, as described above, resets the various digital circuits in the feedback control. The output voltage of the regulator is monitored by a voltage controlled oscillator 18 whose output frequency is a function of the magnitude of the output voltage.

The frequency output of the voltage controlled oscillator 18 is the basic regulatory signal that determines the duration of conduction in switch 12. The output of the voltage controlled oscillator 18 is applied to the up counter 19 which counts and averages the pulse outputs from the oscillator 18. The time dependent count which accumulates in counter 19 is a binary number representative of the average voltage output of the regulator during the modulation period. The count output of the counter 19 is applied to a comparator 21. The feedback circuit includes a reference count register 22 which stores a preset reference count in the form of a binary number designed to be indicative of the regulated output voltage desired. This reference count is applied to the comparator 21, via an up-down counter 28. The up-down counter 28 modifies the reference count in accord with the various feedback functions as discussed below.

The reference count is modified via the up-down counter 28 with the specific intent to achieve certain desired static and dynamic responses in the regulatory feedback control. When the accumulated count in the counter 19 equals the modified reference count applied by up-down counter 28 to the comparator 21, the comparator 21 responds and applies a turn-off signal to the switching device 12.

The up-down counter 28 operates specifically to modify the reference count in response to differential, integral, and gain control circuitry. The differential, integral, and gain control circuitry all operate under the control of the central feedback sequencing control 65.

The central feedback sequencing control 65 controls the sequence of application of gain, integrative, and differentiation modification signals utilized to modify the reference count. It controls the gain of the integral and differential modification signals by shifting of constants within the circuit which are applied to the up-down counter 28. The sequencing control 65 basically monitors the accumulated binary counts in the integral and differential circuits and multiplies them by appropriate gain constants to secure the desired feedback characteristics. These binary signals are then converted into an equivalent serial pulse train and introduced into the basic feedback loop where they are utilized to modify the invariant reference count via the up-down counter 28.

The various numbers representing the desired feedback gains, integrative, and derivative control signals which exist in the form of digital binary numbers are applied to a data select circuit 40 which is included in the sequencing control 65. A differential gain multiplier source 47 and an integral gain multiplier source 48 are connected, via leads 66 and 67, to the data select circuit 40. These two sources supply separate digital gain multiplication for the derivative and integrative feedback function. Each source comprises a predetermined binary multiplier value which is utilized to control the shifting of the binary numbers representing feedback signals proportional to the gain, derivative, and integrative functions in order to achieve the desired gains. These sources may be embodied as count registers. The output of shift register 53 is applied to input lead 68 of the data select circuit 40. This output is representative of the difference between the accumulated count and the reference count as modified by the integral gain multiplier function. The output of shift register 50 is applied to input lead 69 of the data select circuit 40. This output is representative of the derivative feedback function as modified by the derivative gain multiplier function. The output of the up-down counter 54 is applied to the input lead 70 of the data select circuit 40. This output is representative of the integrative function as modified by the integrative gain function. These input functions are in the form of a binary count. The central feedback sequencing control 65 converts these counts to serial pulses. These pulses are applied to the up-down counter 28 in a sequential fashion to modify the reference count in order to obtain selected desired regulatory characteristics in the voltage regulator.

The data select circuit 40 is functionally a multiplexing unit which sequentially selects for transmission the data applied to each of its plurality of input terminals. For example, the data in one input terminal is selected for transmission by the data select and connected to the output lead 71. Subsequently another input terminal is connected to the output lead 71. The stepping of the data select from one input terminal to another is controlled by a sequence counter 41 which applies a stepping signal thereto via lead 88. The sequence counter 41 comprises a circuit which is periodically reset by the clock and which responds to the output pulse of the one-shot multivibrator circuit 43 to generate a signal on lead 88 in order to step the data select 40 to the next input terminal. The selected data transmitted by the data select circuit 40 is transmitted via an output lead 71 to a comparator circuit 45.

The clock circuit 20 is utilized to synchronously drive a pulse generator 46 which generates a stream of high frequency pulses. The pulse generator frequency is higher than that of the clock. These high frequency pulses are applied, via lead 87, to an up counter 44 and, via lead 82, to a plurality of AND gates. The accumulating count of the counter 44 is applied to the comparator circuit 45.

When the accumulating count in counter 44 equals the count on output lead 71 of the data select 40, the comparator 45 generates an output signal which triggers a one-shot multivibrator circuit 43. The output of the one-shot multivibrator circuit 43 is applied to the sequence counter 41 and, via lead 89, to the reset input of counter 44. The sequence counter 41 includes a plurality of states to which it is sequentially stepped in response to the input pulse signal supplied by the one-shot multivibrator 43. The state of the sequence counter 41 controls the selective connections of the input and output terminals of the data select circuit 40 and the line select circuit 42, respectively. The sequence counter 41 advances one state upon the completion of each selected binary-to-serial conversion within the central feedback sequencing controls. When the sequence counter 41 state is advanced to its final state, the up counter 44 is disabled by the inverter output of inverter 59 as described below. The sequence counter 41 is reset by a clock pulse on lead 90 at the beginning of each period of operation of the regulator.

As states of the sequence counter 41 are advanced, it applies a signal, via lead 88, to step the data select 40 so that the plurality of input terminals are sequentially coupled to the output terminal 71. It is apparent that as the sequence counter is stepped, first input lead 66 will be connected to output lead 71, then input lead 67 is connected to output lead 71, and so on.

The binary-to-serial conversion within the central feedback sequencing circuit 65 is accomplished by gating a series of pulses for a controlled interval of time. The interval of time is a function of the binary number output of the data select circuit 40. This interval of time is determined by the time required for the accumulating count in the counter 44 to achieve equality with the count transmitted by the data select circuit 40. The series of pulses are supplied by the pulse generator 46. The pulse output of pulse generator 46 is applied, via lead 82, to a plurality of AND gates 56, 57, 58, 59, and 60.

The line select circuit 42 supplies the signals controlling the transmission of pulses through the AND gates 56 through 60. The line select circuit 42 is essentially a demultiplex type circuit which is stepped in response to the sequence counter 41 in synchronism with the data select circuit 40. The output of the line select circuit 42 on leads 76 through 80 is a signal of controlled time duration as determined by the action of the comparator 45 and the sequence counter 41. These signals control the duration of pulse transmission through the AND gates 56 through 60.

The operation of the above-described pulse train transmission duration control effects the desired binary-to-serial conversion. Take, for example, the differential gain constant applied by integral gain source 48, via lead 67, to the data select 40. This gain constant establishes a particular gain in the feedback of the integral signals. The differential gain source 48 applies a preselected binary number representing gain to the data select circuit 40. This in turn is applied, via lead 71, to the comparator 45 and determines the time duration during which pulses are transmitted by the AND gate 56. The serial pulse output of the generator 46 applied to AND gate 56 will be transmitted therethrough until the count in the counter 44 equals the binary number set by the integral gain source 48. At this point the comparator 45 operates to step the sequence counter 41 to its next state and the output through the AND gate 56 is terminated. The pulse output through the AND gate 56 is applied to a shift register 53 and operates to change the gain of the integral function.

The next input lead 67 is connected to the differential gain source 47. The binary-to-serial conversion is made as described above and the pulse train is transmitted, via AND gate 57, to shift register 50 in a similar fashion. The outputs of the AND gates 56 through 60 are, as described above, a serial train of pulses having a controlled count. These pulses are applied to counting circuits in the feedback circuitry to secure the desired regulation characteristics. At the end of a cyclic sequence, the sequence counter 41 is reset to an initial state in preparation for a subsequent period of operation of the switch 12. The output 81 of the line select circuit 42 applies a signal via inverter 59 which operates to disable the up counter 44 for a short time during this reset interval.

The serial pulse output of AND gate 56 is applied to shift register 53 and is utilized to adjust the gain of the integral feedback function. The serial pulse output of AND gate 57 is applied to the shift register 50 and determines the gain of the differential function.

The outputs of the two AND gates 58 and 59 are applied to a subsequent OR gate 55. The output of OR gate 55 is in turn applied to an up-down counter 28 which modifies the reference count supplied by the reference count source 22. The serial pulse output of AND gate 60 is applied to the up-down counter 54. This count is a summation count used in determining the integral function.

The integral and differential modifying counts are representative of the static error of the output voltage and the rate of change of the output voltage, respectively. These modifying counts are in a phase canonical form of the memory states of the filter 5 and are derived from the output voltage of the voltage regulator through the voltage controlled oscillator 18. This method of sensing is equivalent to monitoring and feeding back the state variables represented by the inductor current and capacitor voltage with only one direct electrical connection to the filter. The voltage is sensed by a direct connection and its derivative is obtained directly via the differential function.

The differential modifying count is determined in response to the difference in successive counts of the counter 19. Initially the count of counter 19 is preset in the down counter 51, via lead 83. The output of the voltage controlled oscillator 18 is applied to the down counter 51, via lead 84, and the pulse output counts down from the initialized or preset count to secure a difference count. This difference is applied to the shift register 50.

The shift register 50 operates to multiply the differential modifying count by the differential gain factor by shifting the count an appropriate number of times. This resultant binary count is applied, via lead 69, to the data select circuit 40 of the central feedback sequencing control 65. It is converted therein to a serial train of pulses as described hereinabove and subsequently applied to the up-down counter 28 to modify the reference count.

In addition to the differential function, an integral function is added to the feedback control data to eliminate static error in the output of the regulator. The integration is digitally implemented through the summation of successive difference counts proportional to the feedback error. The output of the up counter 19 is applied, via lead 85, to a subtractor 52. A reference count supplied by a reference count register 92 is periodically reset in the subtractor in response to the clock 20. This reference count is selected to be representative of the maximum unregulated output capability of the regulator. This is in contrast to the reference count of the reference count register 22 which is selected to be representative of the desired regulated output of the regulator. The difference count secured through the operation of subtraction is applied to the shift register 53 which operates to multiply the integral modifying count by the integral gain factor by shifting the count an appropriate number of times. The binary count is applied, via lead 68, to the data select circuit 40 of the central feedback sequencing control 65. It is converted therein to a serial train of pulses and applied, via AND gate 60, to the up-down counter 54. The number accumulated in the up-down counter 54 is a serial count which is proportional to the integral of the error voltage of the regulator voltage output. The output of the up-down counter 54 is applied back to the input of the data select 40, via lead 70, which operates to generate a digital pulse stream which is applied, via AND gate 55 and lead 82, to the up-down counter 28 to supply an integration responsive modification to the reference count.

It is apparent from the foregoing description that through the use of digital circuits differential and integral control can be implemented under control of a central feedback sequencing control. Each control signal is generated in sequence and applied to an up-down counter 28 to modify a reference count during each period of operation of the switching device. By using digital circuitry throughout, the inherent disadvantages of using analog circuitry discussed hereinabove in the introduction are eliminated.

What is claimed is:

1. A switching type voltage regulator comprising input means, output means, switching means coupling said input and output means, means for periodically initiating conduction in said switching means, a voltage controlled oscillator coupled to be responsive to a voltage magnitude at said output means, counting means responsive to an output of said voltage controlled oscillator, means for determining a difference in successive counts as accumulated by said counting means for recording a first count during one period of operation of said switching device and means coupled to said voltage controlled oscillator for counting down from said first count to derive a second count, a reference count register, comparator means, a first up-down counter coupling said reference count register to said comparator, said second count being coupled to said first up-down counter, said comparator means coupled to respond to an equality of a count in said counting means with a reference count modified by said first up-down counter and operative to terminate conduction in said switching means.

2. A switching type voltage regulator as defined in claim 1 further including integral means comprising: a second reference count register; means for accumulating over successive periods a difference count between a count of said counting means and a preset count of said second reference count register; a second up-down counter coupled to be responsive to said difference count; an output of said second up-down counter being coupled to said first up-down counter.

3. A digitally controlled switching regulator including a switching device coupling input and output terminals, modulation means for converting a signal magnitude at said output terminal into a signal frequency, first counting means coupled to count frequency pulses of said signal frequency, comparison means responsive to said first counting means at a predetermined count to establish a conducting interval of said switching device, differential means for deriving a derivative function responsive to a rate of change of a signal magnitude at said output terminal, comprising, difference means for deriving a difference between successive counts of said first counting means, means for altering said predetermined count in response to an output of said difference means comprising a reference count source preset at said predetermined count and a first up-down counter coupled to said reference count source in order to permit count increments to be included with said predetermined count.

4. A digitally controlled switching regulator as defined in claim 3 wherein said differential means comprises a down counter, means for initializing said down counter with an antecedent count of said first counter and said down counter being coupled to count down in response to said modulation means.

5. A digitally controlled switching regulator as defined in claim 3 further including integral means for deriving an integrative function responsive to a signal error with respect to a desired signal magnitude at said output terminal comprising a second reference count source, integral approximation means for deriving a summation of successive difference counts between the output of said modulation means and a second predetermined count preset in said second reference count source, the output of said approximation means being coupled to said first up-down counter.

6. A digitally controlled switching regulator as defined in claim 5 wherein said approximation means comprises subtraction means coupled to determine a difference between the count output of said modulating means and said second predetermined count, and a second up-down counter responsive to said difference count, an output of said second up-down counter being applied to said first up-down counter.

7. A regulator circuit comprising, input means for accepting a source of energy, output means to accept a load to be energized, a switching device coupling said input and output means, transducer means coupled to said output means and operative to convert a signal magnitude thereat into a signal frequency, counting means coupled to said transducer means for counting cycles of said signal frequency, timing means to establish a periodicity of switching and operative to periodically reset said counting means, storage means for storing a preselected reference count, down counting means coupled to said counting means for counting down from a previously initialized count in response to a count accumulation in said counting means, modifying means connected to said storage means and operative for controllably modifying said preselected reference count, count comparing means coupled to receive outputs of said counting means and said modifying means, count signal processing means for controlling application of an output of said down counting means to said modifying means, and said count comparing means responsive to a count of said counting means and said modifying means thereof for producing a control signal coupled to said switching device and controlling a conduction interval therein.

8. A regulator circuit as defined in claim 7 further including, second storage means containing a preset count, subtraction means coupled to said counting means to determine a difference between a count and a preset count in said second storage means, an up-down counter responsive to an output of said subtraction means for accumulating successive difference counts, and an output of said up-down counter being coupled to said count signal processing means for application to said modifying means.

* * * * *